United States Patent Office 2,902,516
Patented Sept. 1, 1959

2,902,516

AROMATIC DIALDEHYDES

Ellis R. White, Oakland, Calif., assignor to Shell Development Company, New York, N.Y., a corporation of Delaware No Drawing. Application January 20, 1956
Serial No. 560,287

12 Claims. (Cl. 260—599)

This invention relates to a new class of aromatic dialdehydes and the processes of preparing the same. More particularly, it relates to hexa-substituted benzenes having 4 of the ring carbon atoms attached to separate hydrocarbon radicals and the 2 remaining ring carbons being attached directly to two separate formyl groups, i.e., —CHO.

It is an object of this invention to provide a new class of tetrahydrocarbon substituted benzene dialdehydes. It is another object of this invention to provide a new class of starting materials for the preparation of tetrahydrocarbon substituted benzene dicarboxylic acids which in turn may be used as ingredients of polyester resins. Still another object of this invention is to provide several processes whereby the products of this invention may be prepared. Other objects will become apparent as the description proceeds.

These and other objects are achieved by a compound having the formula

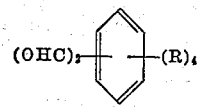

wherein the R's are hydrocarbon groups.

Numerous types of tetrahydrocarbon substituted dialdehydes are within the scope of this invention as the R's in the above formula may be aromatic, aliphatic or mixtures of both. In any case, the novel compounds of this invention are characterized by having all six of the benzene carbon atoms separately substituted. Among the mixed substituted benzene dialdehydes of this invention are dialkyl diphenyl benzene dialdehydes such as 3,6-dimethyl-4,5-diphenyl benzene dialdehyde, 2-pentyl-6-ethyl-4,5-diphenyl benzene dialdehyde, 1,2-didecyl-4,5-diphenyl benzene dialdehyde, 1,2-diisopropyl-3,4-diphenyl benzene dialdehyde, and the like.

The hydrocarbon substituents may comprise a single aromatic and three aliphatic substituents such as 1,2,3-trimethyl-4-toluyl benzene dialdehyde, 1-methyl-4-ethyl-5-stearyl-6-phenyl benzene dialdehyde, 1,3,5-triethyl-6-naphthyl benzene dialdehyde, 1-naphthyl-3,4,5-tributyl benzene dialdehyde, and the like. It is preferred, however, that the benzene dialdehydes having four hydrocarbon substituents all be aliphatic. Examples of this preferred group include 1,2,3-trimethyl-4-ethyl benzene dialdehyde, 1,2-diethyl-4,5-dimethyl benzene dialdehydes, 1,2,3-triethyl-5-methyl benzene dialdehyde, and the like. In addition to ethyl and methyl substituents, the hydrocarbons may include any mixture of propyl, butyl, pentyl, hexyl, heptyl, octyl, nonyl, decyl, stearyl, mirstyl, and the like radicals. Examples of such compounds include 1-propyl-2-butyl-3,4-dipentyl benzene dialdehyde, 1-pentyl-3-propyl-4-butyl-5-methyl benzene dialdehyde, and the like Particularly preferred compounds of this invention are those of the formula

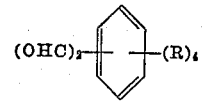

wherein the R's are the same aliphatic hydrocarbon radicals containing up to 8 carbon atoms. Among such compounds are 1,2,3,4-tetrabutyl benzene dialdehyde, 1,3,4,6-tetrapentyl benzene dialdehyde, 1,3,5,6-tetrahexyl benzene dialdehyde, 1,2,3,4-tetraoctyl benzene dialdehyde and the like. Of particular value as starting materials for the preparation of valuable benzene tetrahydrocarbon substituted dibasic acids are the products of this invention wherein the hydrocarbon substituents are lower alkyl groups selected from methyl, ethyl and propyl. Among these compounds are the tetramethyl benzene dialdehydes such as durene dialdehyde, isodurene dialdehyde and prehnitene dialdehyde. The ethyl dervatives include 1,2,3,4-tetraethyl benzene dialdehyde, 1,3,4,6-tetraethyl benzene dialdehyde and the like. The propyl compounds include 1,3,5,6-tetrapropyl benzene dialdehyde, 1,2,3,4-tetrapropyl benzene dialdehyde, and the like.

It will be seen then, that the hydrocarbon substituents may occupy any position on the benzene ring, or more simply, the two formyl radicals may be ortho-, meta- or para- to each other. As a practical matter it makes little difference where the aldehyde groups are located as the ease of the reactions involved in the preparation of these novel dialdehydes and their subsequent utility in the preparation of alkyd resins is determined by the nature of the hydrocarbon substituents rather than the position of the formyl groups.

The novel tetrahydrocarbon substituted dialdehydes of this invention may be prepared by any of several methods. In all methods, the ultimate starting material is the same although different intermediate process steps and products are involved. In general, starting materials for the production of the novel products of this invention include any tetrahydrocarbon substituted benzene. Thus, for example, using the simplest case, durene may be reacted to ultimately produce durene dialdehyde.

One method whereby the tetrahydrocarbon substituted benzene dialdehydes are produced comprises the reaction, under heat, of a bis(t-butylperoxymethyl) tetrahydrocarbon substituted benzene in the presence of an alkali metal hydroxide such as sodium hydroxide. Bis(t-butylperoxymethyl) tetrahydrocarbon substituted benzenes and process for preparing the same are described in copending application, Serial No. 579,167, filed April 19, 1956, now U.S. Patent No. 2,813,127. For the purpose of this description it is sufficient to state that they may be prepared from the interaction of bis-chloromethyl tetrahydrocarbon substituted benzenes with tertiary butyl peroxide.

In this method the alkali metal is used in the form of an alcoholate which may be prepared by the action of a lower alcohol on free alkali metals. The particular alcohol that is used may be varied depending on the tetrahydrocarbon substituted benzene involved. In general, the reaction of the bis(t-butylperoxymethyl) tetrahydrocarbon substituted benzene and the alkali metal hydroxide will require elevated temperatures in the order of about 100 to 125° C., therefore the alcohol that is selected should have a sufficiently high boiling point. It is found that alkali metal butylates are particularly suited for this purpose as their boiling points are satisfactory in almost all instances.

Temperatures below 100° C. may often be used but it will generally be required that high pressures be used in conjunction therewith. When such is the case, alcoholates of ethanol and propanol will be satisfactory. In the preferred method sodium butylate, initially present in slight excesses of the molar equivalent of the bis(t-butylperoxymethyl)tetrahydrocarbon substituted benzene, is reacted at temperatures of about 115° C. Temperatures substantially higher than 125° C. are not recommended as there results lower yields due to degradation of the product.

Another method for the preparation of the novel tetrahydrocarbon substituted benzene dialdehyde of this invention comprises the reaction of a nitric acid diester of bis(hydroxymethyl)tetrahydrocarbon substituted benzene in the presence of an alkali metal hydroxide. Such nitric acid diesters are conveniently prepared from the corresponding dihydroxymethyl tetrahydrocarbon substituted benzenes. This method may be represented as follows:

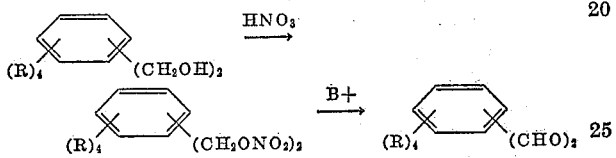

In this equation the R's are hydrocarbon radicals and will be the same throughout the reaction and B indicates an alkali metal hydroxide which is preferably added in the form of an alcoholate, preferably sodium butylate, as indicated above. The nitration of the simpler bis(hydroxymethyl) tetrahydrocarbon substituted benzenes with nitric acid proceeds rapidly at low temperatures, e.g., in the order of about 10–25° C. in the presence of an inert solvent such as chloroform, benzene, toluene, and the like. The quantity of nitric acid that is used is in slight excess of two moles for each mole of the bis(hydroxymethyl) tetrahydrocarbon substituted benzene. After the nitration is complete, the nitric acid ester is neutralized with an alkali metal alcoholate as previously indicated. As a precautionary measure it is recommended that the nitric acid ester be added to previously prepared alcoholate as the reaction may become violent.

The time required for the neutralization reaction to go to completion will vary greatly depending on the particular tetrahydrocarbon substituted benzene involved. Where the substituents are of comparative higher molecular weight, or of greater chain length, longer reaction time will be required. Thus, for example, about 24 hours of refluxing will be required when the hydrocarbon substituents are mixed aliphatics and aromatics. On the other hand about 2 hours are required where the four hydrocarbon substituents are lower alkyl such as methyl.

After the reaction is completed, the solution is treated, while hot, to remove the alkali metal salts that formed. This may be accomplished by any conventional means such as filtration, centrifuging, and the like. The solvent is removed by evaporation, or any other means, and the residue is treated with toluene or a similar solvent to thereby dissolve the desired product. The mass is filtered and the dialdehyde product isolated from the solution by distilling off the solvent.

Among the starting nitric acid diesters the following represent ones that will form corresponding tetrahydrocarbon substituted benzene dialdehydes: bis(nitromethoxy)1,2,3-trimethyl-4-ethyl benzene, bis(nitromethoxy)1,2-dipentyl-4,5-diphenyl benzene, bis(nitromethoxy)-1,2-dimethyl-4,5-diethyl benzene, bis(nitromethoxy) prehnitene, bis(nitromethoxy) isodurene, and the like.

Still another method for the preparation of the novel dialdehydes of this invention comprises the hydrolysis of alkali metal salts of tetrahydrocarbon substituted benzene diglyoxylic acids. Such salts may be prepared by the reaction of an alkali metal hydroxide on the tetrahydrocarbon substituted benzene diglyoxylic acids.

To illustrate the manner in which the invention may be carried out the following examples are given. It is to be understood that the examples are for the purpose of illustration and the invention is not to be regarded as limited to any of the specific materials or conditions recited therein. In the examples, the quantity of the ingredients are expressed in parts by weight.

*Example I*

To 33.8 parts of bis(t-butylperoxymethyl) durene in 162 parts of n-butanol is added a small quantity of a methanolic solution containing 1.2 parts sodium hydroxide. The reactants are heated to reflux in a reaction vessel equipped with an agitator, thermometer and reflux condenser. After the mixture refluxes for about 15 minutes, with constant agitation, it is neutralized with hydrochloric acid whereupon sodium chloride forms. The salt is separated by filtration and the butanol is evaporated and condensed and used in subsequent operations. The residue, containing the impure product, is distilled to 220° C. at 20 mm. and thereafter crystallized from methanol to yield 85% of a colorless product, M.P. 171–2° C., B.P. 210° C. at 20 mm., identified as durene dialdehyde.

*Example II*

79 parts of bis(nitromethoxy) isodurene is added in increments over a period of 45 minutes to a solution of sodium tertiary butylate prepared by the reaction of 12.5 parts of sodium and 160 parts by weight of t-butyl alcohol. When the addition is completed, the mixture is refluxed for two hours after which sodium nitrite is filtered from the hot (60° C.) solution. Tertiary butyl alcohol is removed by evaporation and the residue treated with 430 parts by weight of boiling toluene for about 30 minutes. The solution is again filtered to remove a gelatinous precipitate and then stripped of the toluene. The residue is identified as isodurene dialdehyde.

*Example III*

The procedure of Example II is repeated except that bis(nitromethoxy) prehnitene is substituted for the bis(nitromethoxy) isodurene. The product is identified as prehnitene dialdehyde.

*Example IV*

30 parts of bis-(t-butylperoxymethyl) triethyl methyl benzene (prepared by the reaction of 1,4-chloromethyl triethyl methyl benzene with t-butyl hydroperoxide) is added to 165 parts of sodium butylate. After refluxing for a few hours, the solution is cooled to about 50° C. and neutralized with dilute hydrochloric acid. On further cooling sodium hydroxide precipitates and is removed by filtration. The n-butanol is distilled off leaving a residue of triethyl methyl benzene-1,4-dialdehyde which is recrystallized from benzene.

*Example V*

The procedure of Example IV is repeated using di(t-butylperoxymethyl) - 1,2,3-triethyl - 4 - methylbenzene to yield 1,2,3-triethyl-4-methylbenzene dialdehyde.

*Example VI*

10 parts of durene diglyoxylic acid is treated with 1.3 parts of potassium hydroxide in 5 parts of water to form the potassium salt of durene diglyoxylic acid. Upon boiling in water there is formed durene dialdehyde.

The preparation of the products of this invention by (1) the cleavage of the bis(t-butylperoxymethyl) tetrahydrocarbon substituted benzenes and (2) by cleavage of the nitrate ester of bis(hydroxymethyl) tetrahydrocarbon substituted benzenes are related to each other in that they both involve esters of oxy-acids which split into an aldehyde and a stable anion. In the first situation an ester of an organic acid is involved and in the latter, esters of nitric acid are involved. Such is found to be the case when other oxy-acids are used and the processes described above are not limited to the specific embodiments described or shown. Thus, examples of oxy-acids other than nitric acid that may be used are typified by hypochlorous acid, sulfuric acid, phosphoric acid, hydrogen peroxide and the like, or esters of organic acids having the formula

wherein R is lower alkyl.

The preferred embodiments are described above and further exemplified by the examples in which the particular esters are those of nitric acid and tertiary butyl hydroperoxide although it will be understood that the processes are not limited thereto.

The novel tetrahydrocarbon substituted benzene dialdehydes of this invention are particularly useful in the preparation of tetrahydrocarbon substituted benzene dicarboxylic acids which are valuable ingredients for alkyd resins.

I claim as my invention:

1. A process for the preparation of tetrahydrocarbon substituted benzene dialdehydes which comprises cleaving, with an alkali metal base, a diester of a bis(hydroxymethyl) tetrahydrocarbon substituted benzene, said diester being of an oxy-acid which, upon cleaving, splits into a benzene dialdehyde and a stable anion.

2. A process for the preparation of tetrahydrocarbon substituted benzene dialdehydes which comprises cleaving with an alkali metal base, a diester of a bis(hydroxymethyl) tetrahydrocarbon substituted benzene, said diester being of an oxy-acid which, upon cleaving splits into a benzene dialdehyde and a stable anion and being selected from the group consisting of nitrate esters and t-butyl peroxy esters.

3. A process for the preparation of tetrahydrocarbon substituted benzene dialdehydes which comprises cleaving, with an alkali metal base, a bis(t-butyl peroxymethyl) tetrahydrocarbon substituted benzene.

4. The process of claim 3 in which the substituted benzene is bis(t-butylperoxymethyl) durene.

5. The process of claim 3 in which the substituted benzene is bis(t-butylperoxymethyl) isodurene.

6. The process of claim 3 in which the substituted benzene is (bis(t-butylperoxymethyl) prehnitene.

7. The process of claim 3 in which the substituted benzene is bis(t-butyl peroxymethyl) trimethyl ethyl benzene.

8. A process for the preparation of tetrahydrocarbon substituted benzene dialdehyde which comprises cleaving, with an alkali metal base, a nitric acid ester of bis(hydroxymethyl) tetrahydrocarbon substituted benzene.

9. The process of claim 8 in which the substituted benzene is the nitric acid ester of bis(hydroxymethyl) durene.

10. The process of claim 8 in which the substituted benzene is the nitric acid ester of bis(hydroxymethyl) isodurene.

11. The process of claim 8 in which the substituted benzene is the nitric acid ester of bis(hydroxymethyl) prehnitene.

12. The process of claim 8 in which the substituted benzene is the nitric acid ester of bis(hydroxymethyl) trimethyl ethyl benzene.

References Cited in the file of this patent

UNITED STATES PATENTS

| | | |
|---|---|---|
| 2,806,877 | Koenecke et al. | Sept. 17, 1957 |
| 2,806,883 | Mikeska et al. | Sept. 17, 1957 |

OTHER REFERENCES

Helferich et al.: J. prakt. Chem. 151, 251–6 (1938).
Helferich et al.: Chem. Abs. 33, 1689 (1940).
Weygand et al.: Ber. deut. Chem. Ges. 80, 391–401 (1947).
Wood et al.: J. Am. Chem. Soc. 72, 2992–3 (1950).
Kornblum et al.: J. Am. Chem. Soc. 73, 880–1 (1951).